(12) United States Patent
Flint et al.

(10) Patent No.: US 10,378,164 B2
(45) Date of Patent: Aug. 13, 2019

(54) REINFORCEMENT SYSTEM AND METHOD FOR CORRUGATED PLATE STRUCTURES

(71) Applicant: CONTECH ENGINEERED SOLUTIONS LLC, West Chester, OH (US)

(72) Inventors: Brian N. Flint, Mason, OH (US); Darrell J. Sanders, Mason, OH (US); Timothy J. Cormier, Cincinnati, OH (US)

(73) Assignee: CONTECH ENGINEERED SOLUTIONS LLC, West Chester, OH (US)

( * ) Notice: Subject to any disclaimer, the term of this patent is extended or adjusted under 35 U.S.C. 154(b) by 225 days.

(21) Appl. No.: 15/356,773

(22) Filed: Nov. 21, 2016

(65) Prior Publication Data

US 2017/0145643 A1 May 25, 2017

Related U.S. Application Data

(60) Provisional application No. 62/258,586, filed on Nov. 23, 2015.

(51) Int. Cl.
*E01F 5/00* (2006.01)
*B32B 3/28* (2006.01)
(Continued)

(52) U.S. Cl.
CPC ............... *E01F 5/005* (2013.01); *B32B 3/28* (2013.01); *B32B 15/01* (2013.01); *E01D 18/00* (2013.01);
(Continued)

(58) Field of Classification Search
CPC ............. B32B 3/28; E04C 2/322; E01F 5/005
See application file for complete search history.

(56) References Cited

U.S. PATENT DOCUMENTS

| 1,999,500 A | * | 4/1935 | Carswell | ................. E01F 5/005 |
| | | | | 405/124 |
| 4,650,369 A | | 3/1987 | Thomas et al. | |

(Continued)

FOREIGN PATENT DOCUMENTS

| JP | 07279358 | 10/1995 |
| JP | 2014194112 | 10/2014 |
| WO | WO 9622717 A1 | 9/1996 |

*Primary Examiner* — Adam Krupicka
(74) *Attorney, Agent, or Firm* — Thompson Hine LLP

(57) ABSTRACT

A corrugated plate structure includes a plurality of corrugated plates connected together to form a corrugated structure having a corrugation direction and a cross-corrugation direction. A reinforcement system includes: a first bracket and a second bracket, where the first bracket extends substantially parallel to the cross-corrugation direction and mounted to side-by-side first and second corrugation crests so as to pass over a corrugation valley that joins the first and second corrugation crest, and where the second bracket is spaced in the corrugation direction from the first bracket, and the second bracket extends substantially parallel to the cross-corrugation direction and mounted to the first and second corrugation crests so as to pass over the corrugation valley. An elongated reinforcing member extends substantially parallel to the corrugation direction and mounted to both the first bracket and the second bracket.

19 Claims, 8 Drawing Sheets

(51) Int. Cl.
*B32B 15/01* (2006.01)
*E01D 18/00* (2006.01)
*E01D 19/00* (2006.01)

(52) U.S. Cl.
CPC ....... *E01D 19/00* (2013.01); *Y10T 428/12375* (2015.01)

(56) References Cited

U.S. PATENT DOCUMENTS

| | | |
|---|---|---|
| 4,691,491 A | 9/1987 | Lilley |
| 5,326,191 A | 7/1994 | Wilson et al. |
| 7,174,686 B1 | 2/2007 | Legband |
| 8,327,590 B2 | 12/2012 | Ray |
| 9,027,286 B2 | 5/2015 | Lane |

\* cited by examiner

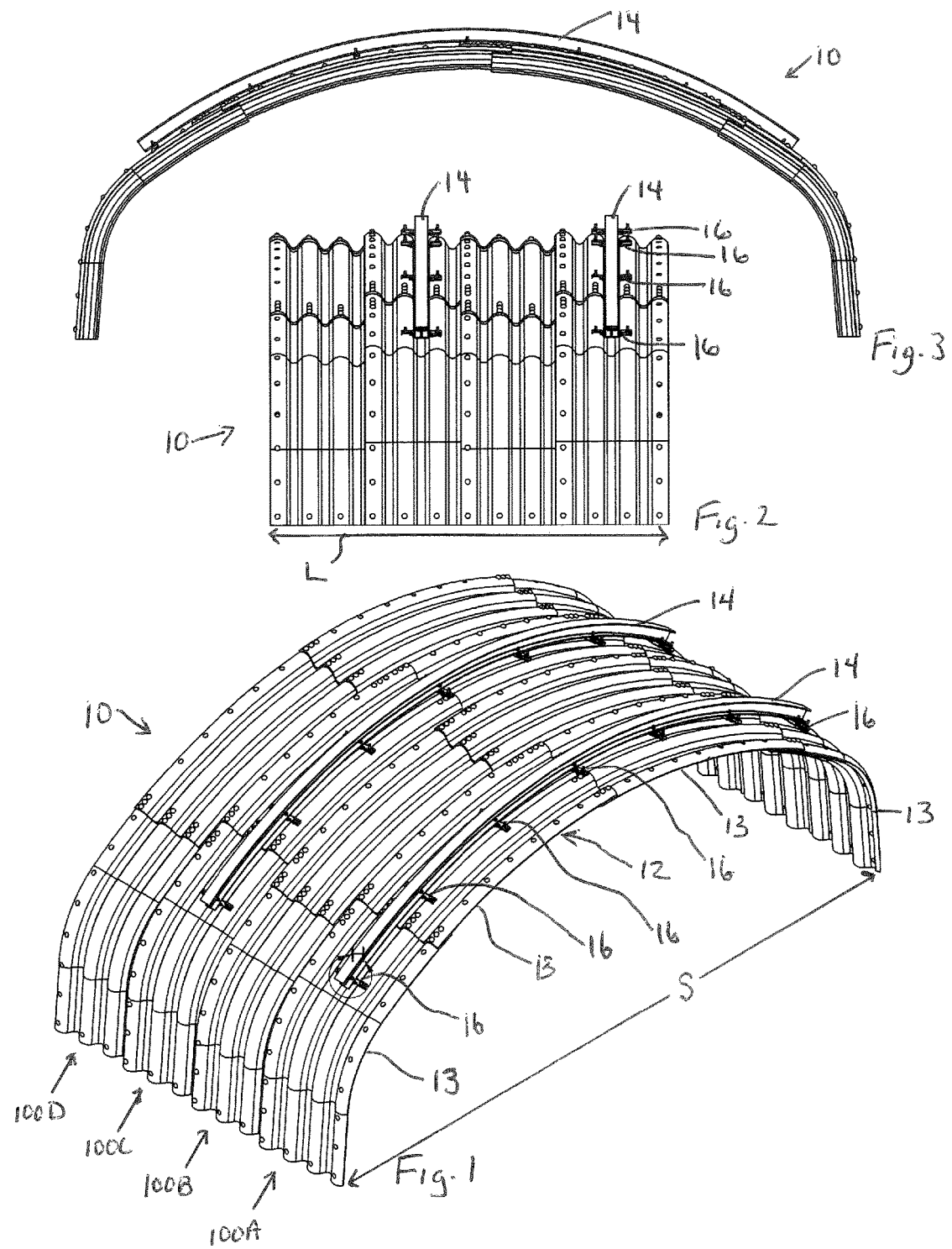

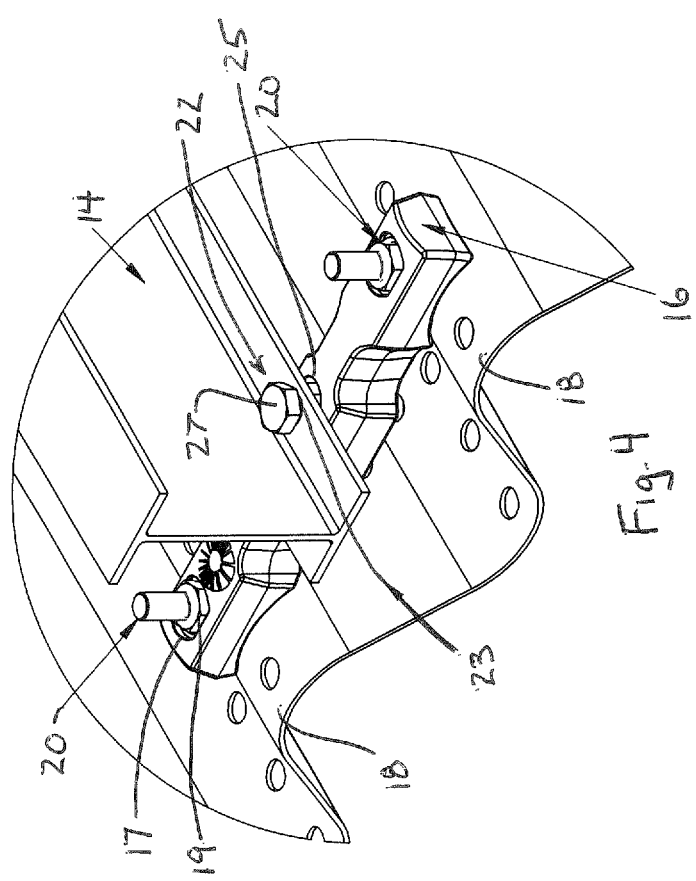

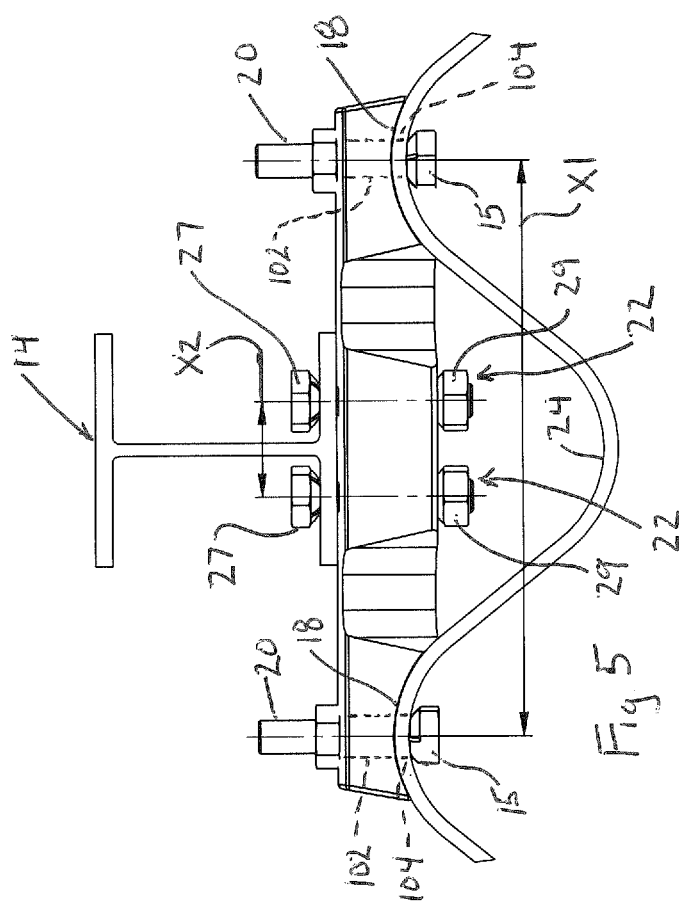

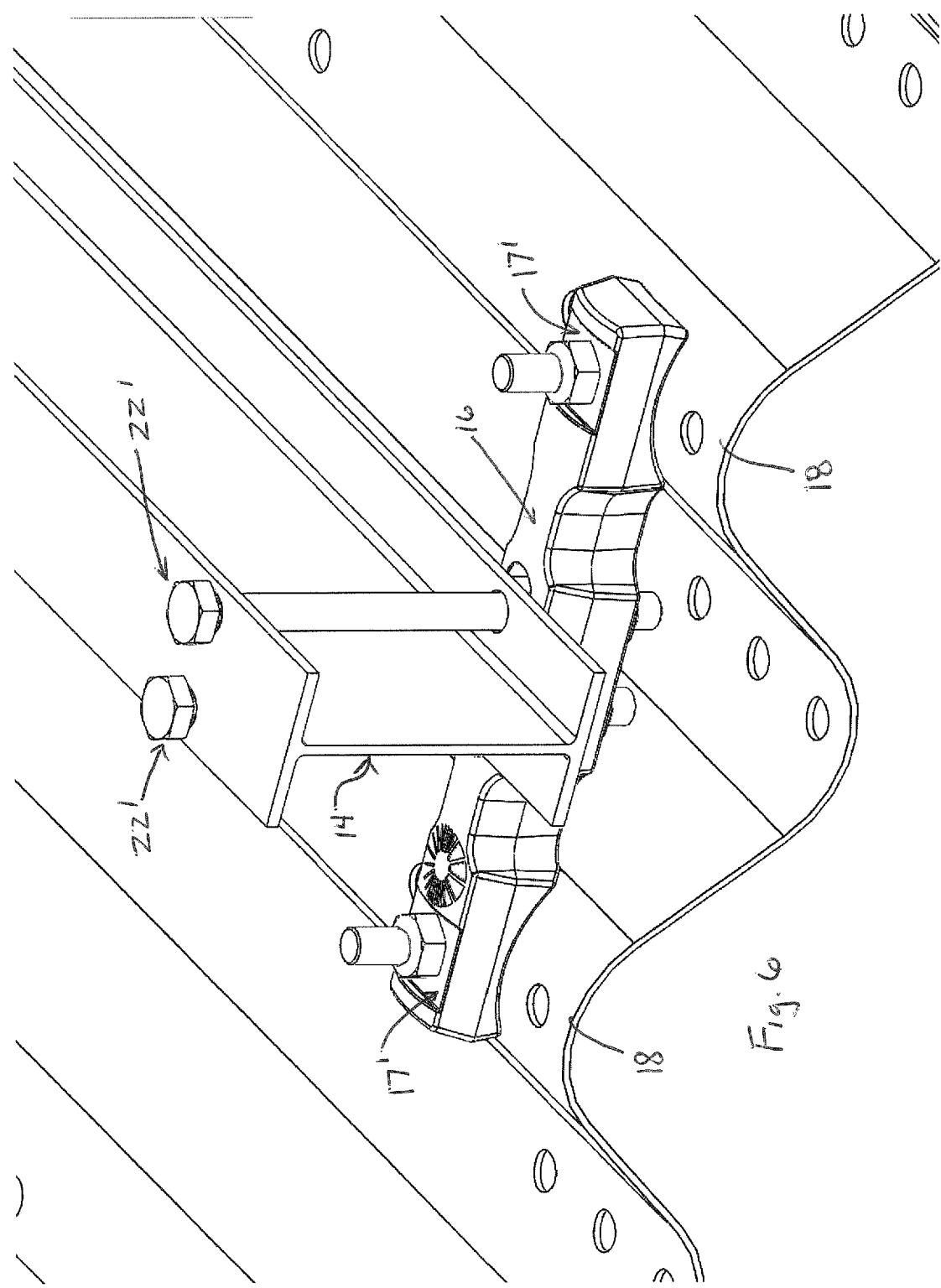

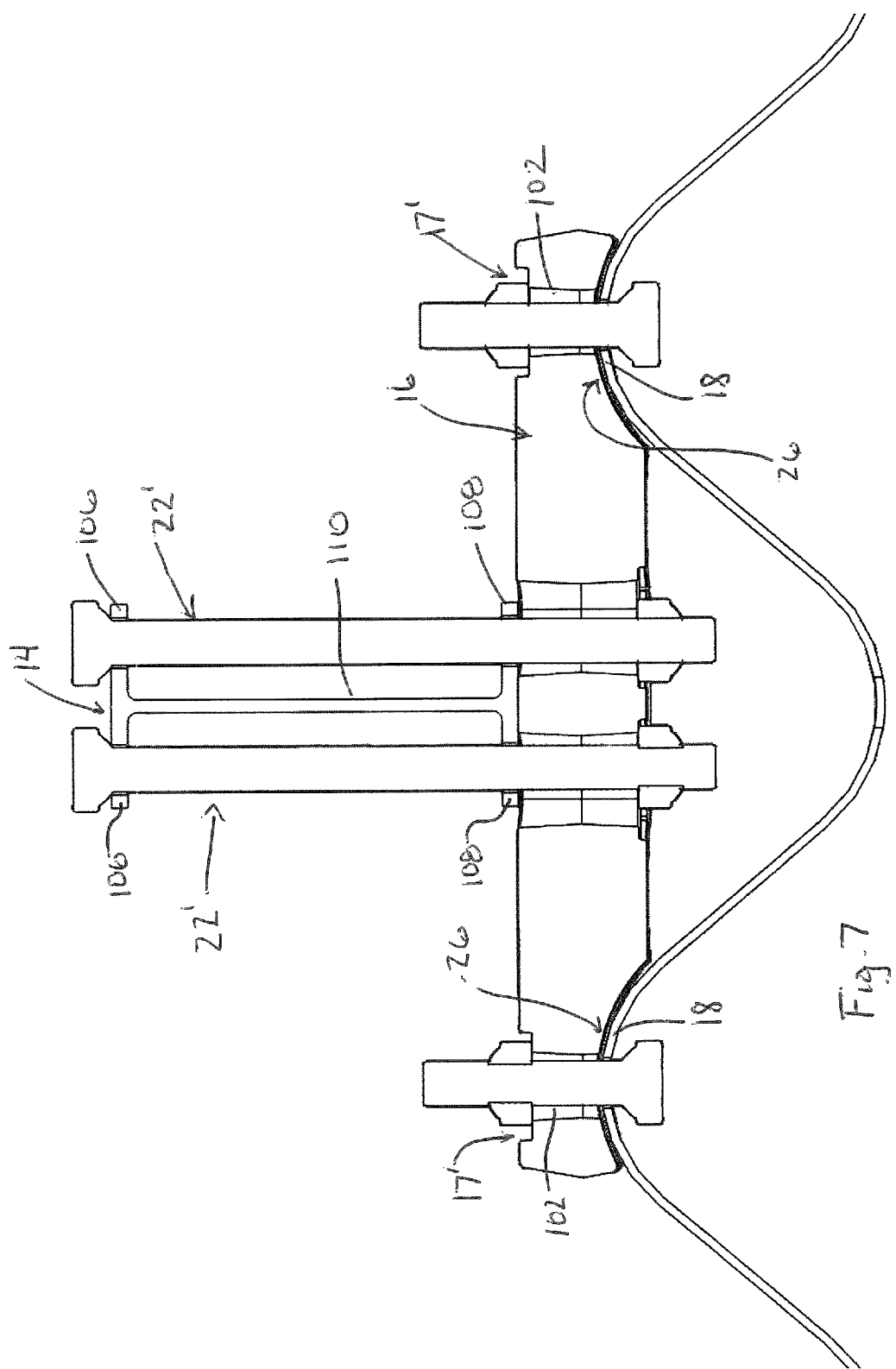

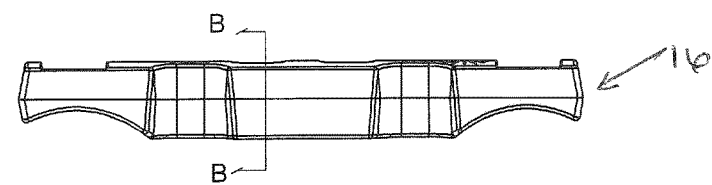
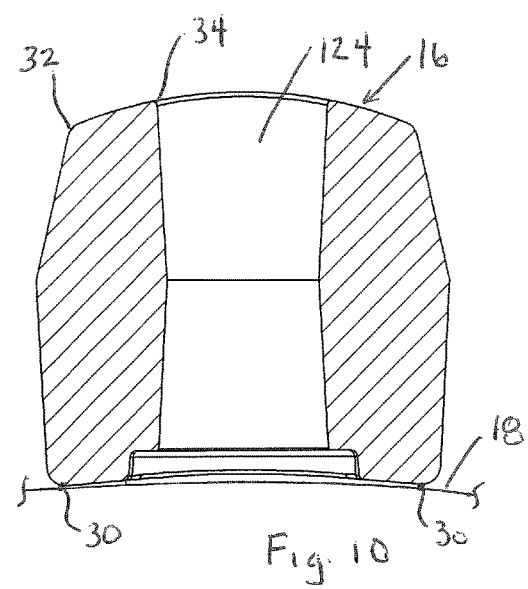
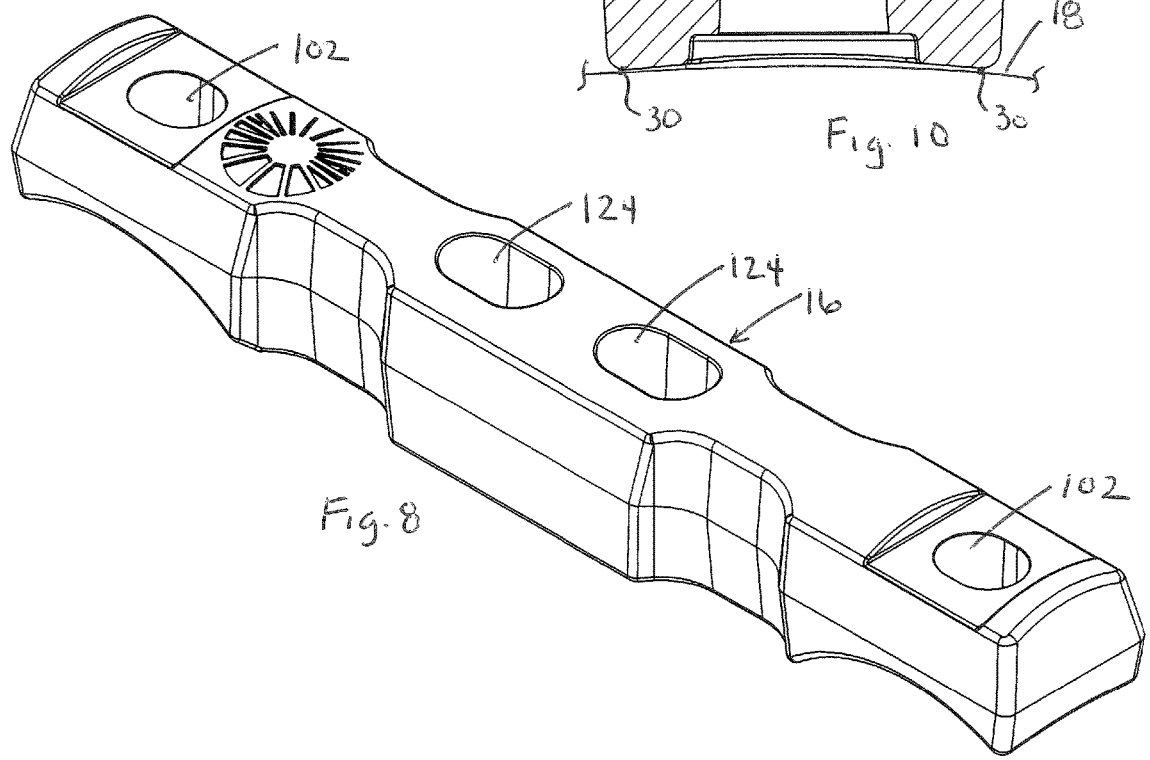

US 10,378,164 B2

REINFORCEMENT SYSTEM AND METHOD FOR CORRUGATED PLATE STRUCTURES

TECHNICAL FIELD

This application relates generally to bridges and other structures formed of corrugated plate and, more specifically, to a system and method of reinforcing such corrugated plate structures.

BACKGROUND

Corrugated metal plate is commonly used in the civil engineering field and construction field to produce structures for a variety of applications in a wide range of markets. For example, corrugated metal plate is commonly used to create tubular structures (round or elliptical) and arch-shaped structures (semi-circular or half-ellipse) culverts/bridges used as stream crossings and vehicular underpasses. In connection with corrugated structures, limits exist in terms of the spans that can be achieved and/or loads that can be carried by such corrugated plate structures, based primarily on the material, the corrugation pattern and gage of the plate being used.

Buried structural plate bridges are comprised of a series of plates that are assembled to form a desired geometry. Many of these structure shapes are large in scale and can have a circumference in excess of 80 feet. Because of the nature of these structures, the structural demand varies greatly along the circumferential length of the structure. With an unreinforced structure design, an engineer must determine the greatest load demand across the entire structure and select a plate thickness that will provide the required resistance to the maximum load demand on the structure. This means that much of the circumferential width of the structure possesses excess capacity. Engineers can use computer modeling or other methods of analysis to determine the load demand across the circumference of the corrugated bridge structure.

Attempts to reinforce corrugated plate structures have been made in the past by placing additional corrugated plate material over the top of the primary corrugated structure in a corrugation peak-to-corrugation peak orientation. However, this arrangement results in an undesired unfilled space within the multi-layered corrugation structure. Other attempts to reinforce corrugated plate structures have included the use of stiffening ribs (e.g., angle-shaped members), but the attachment systems and methods for existing rib stiffeners are labor-intensive and difficult to from a consistency standpoint.

It would be desirable to provide a reinforcement system and method that is repeatable and install-friendly, readily allowing for variations in reinforcement size, spacing and positioning as needed for any given corrugated plate structure.

SUMMARY

In one aspect, a corrugated metal plate structure includes a plurality of corrugated metal plates connected together to form a corrugated structure. A reinforcement system includes a plurality of brackets mounted in a spaced apart manner on the arch structure and a curved reinforcing member mounted atop the plurality of brackets.

In another aspect, a corrugated metal plate structure includes a plurality of corrugated metal plates connected together to form a corrugated structure. A reinforcement system includes a plurality of brackets mounted in a spaced apart manner on the corrugated structure and an elongated reinforcing member mounted atop the plurality of brackets.

In another aspect, a corrugated metal plate structure includes a plurality of corrugated metal plates connected together to form a corrugated structure having a corrugation direction and a cross-corrugation direction. A reinforcement system includes first and second brackets mounted in a spaced apart manner on the corrugated structure and an elongated reinforcing beam mounted to the first and second brackets.

In another aspect, a corrugated metal plate structure includes a plurality of corrugated metal plates connected together to form a corrugated structure having a corrugation direction and a cross-corrugation direction. A reinforcement system includes: a first bracket and a second bracket, where the first bracket extends substantially parallel to the cross-corrugation direction and mounted to side-by-side first and second corrugation crests so as to pass over a corrugation valley that joins the first and second corrugation crest, and where the second bracket is spaced in the corrugation direction from the first bracket, and the second bracket extends substantially parallel to the cross-corrugation direction and mounted to the first and second corrugation crests so as to pass over the corrugation valley. An elongated reinforcing member extends substantially parallel to the corrugation direction and mounted to both the first bracket and the second bracket.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1 is a perspective view of an exemplary reinforced plate structure;

FIG. 2 is a side elevation of the structure of FIG. 1;

FIG. 3 is an end elevation of the structure of FIG. 1;

FIG. 4 is a perspective view of one embodiment of a reinforcement connection to the plate structure;

FIG. 5 is an axial view (in the corrugation direction) of the connection of FIG. 4;

FIG. 6 is a perspective view of another embodiment of a reinforcement connection to the plate structure;

FIG. 7 is an axial view (in the corrugation direction) of the connection of FIG. 6;

FIG. 8 shows a perspective view of one embodiment of a bracket;

FIG. 9 is a side elevation of the bracket;

FIG. 10 is a cross-section of the bracket taken along line B-B of FIG. 9;

DETAILED DESCRIPTION

Figure 11:
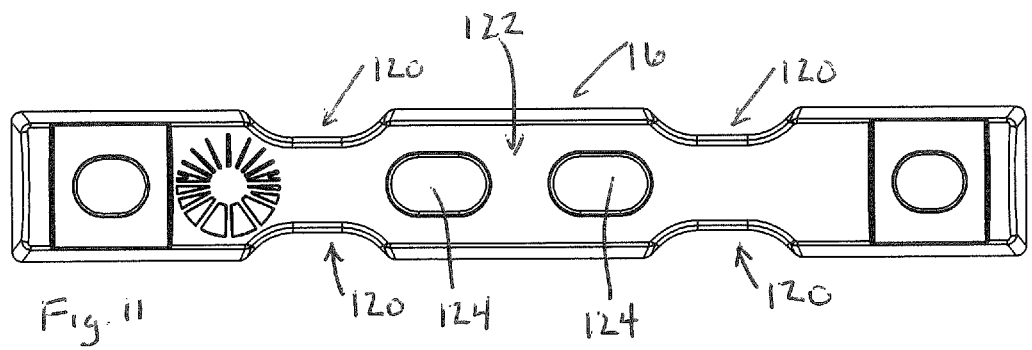
FIGS. 11-14 show top, side, bottom and cross-section views of one embodiment of a bracket.
Figure 12:
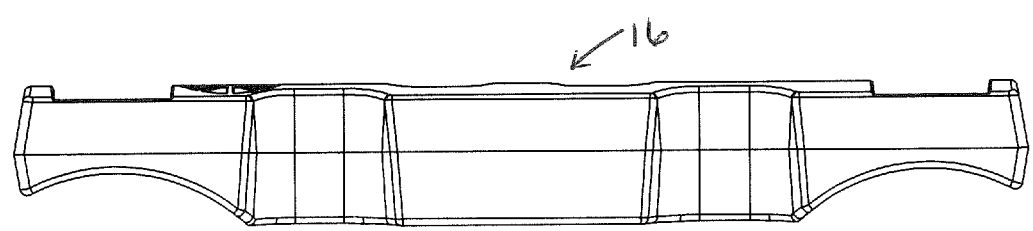

Referring to FIGS. 1-3, an exemplary reinforced metal plate structure 10 is shown. The structure 10 includes a primary arch structure 12 with a curved top wall and linear sidewalls, but many other configurations are possible, such as the entire structure being curved or the top wall being generally linear in addition to the side walls, all of which are still considered arch structures as that term is used herein. Moreover, although the reinforcement arrangement is primarily described herein with respect to arch structures, the reinforcement arrangement could similarly be applied to other corrugated structures, such as structures having any of the end profile shapes shown in FIGS. 15A-15J, or in some cases even corrugated structures that are generally planar.

Referring again to FIGS. 1-3, the arch structure 12 is formed of a plurality of corrugated metal plates 13 of suitable shape and curvature that are bolted or otherwise connected together. In the illustrated embodiment, four corrugated metal plates 13 connected end-to-end in the corrugation direction (i.e., the direction in which each corrugation crest or corrugation runs (or running direction) from one side of the structure to the other) are used to from a corrugated segment with a desired end elevation profile, and four corrugated segments 100A, 100B, 100C, and 100D are connected in the cross-corrugation direction (i.e., perpendicular to the corrugation direction) to define the desired depth of the structure. However, it is recognized that the number and interconnection configuration of the corrugated metal plate structures could vary. Secondary reinforcing beams 14 are connected at the upper side of the primary structure 12. The reinforcing beams 14 are curved to match the profile of the portion of the structure to which the beams are attached and may, for example, be of an I-beam type configuration having a main beam with upper and lower flanges. However, other reinforcing beam configurations/shapes such as angled or L-shapes, are possible. The reinforcing beams 14 increase the load carrying capability of the overall structure 10.

Notably, a series of spaced apart brackets 16 are provided to mount the reinforcing beams 14. As shown in FIGS. 4 and 5, each bracket 16 spans a set of adjacent corrugation crests 18 that run side-by-side in the corrugation direction, and each bracket 16 is connected to each corrugation crest by one or more bolt assemblies 20 that extend through aligned openings 102, 104 of the bracket and the corrugation crest. A center-to-center distance X1 between the axes of the aligned sets openings closely matches the distance between the top of the corrugation crests. In the illustrated embodiment, the bolt head 15 is located at the underside of the structure and the upper ends of the bracket openings are enlarged to define recesses 17 that at least partially receive nuts 19 that are applied to the threaded ends of the bolts, where the openings 17 may be shaped to limit nut rotation. However, other bolt assembly configurations are possible. The reinforcing beam 14 is bolted to each of the brackets 16 using bolt assemblies 22 separated by distance X2 in the cross-corrugation direction. In the illustrated embodiment, the bolts of assemblies 22 pass through openings 23 in the lower flanges of the I-beam and openings 25 in the bracket, with the bolt heads 27 located above (atop the lower beam flange) and the nuts 29 located below (beneath the bracket), but other variations are possible. Notably, as best seen in FIG. 5, the underside of each brackets 16 may be spaced above the corrugation valley 24 so that overfill material (e.g., soil and/or rock) can readily fill the spaced below the bracket 16 when the structure 10 is installed as an overfilled bridge.

FIGS. 6 and 7 depict an alternative embodiment of reinforcing member connection to the bracket where the bolt assemblies 22' that interconnect the two extend through aligned openings in both the upper flanges 106 and lower flanges 108 on both sides of the main beam 110 of the reinforcing member 14. This configuration provides more support for the top flanges 106 of the reinforcing member 14. Because flanges 106 are placed in compression at various locations across the structure due to bending forces, the lateral support provided by the attachment of the bolt assemblies to the top flanges 106 improves the ductility of the overall system and in some cases can increase the capacity of the structure/beam system. Notably, the bracket 16 of the embodiment of FIGS. 6 and 7 is slightly different than that of FIGS. 4 and 5 in that a large, recessed channel 17' atop the bracket defines a seating surface for the nuts of the bolt assemblies that interconnect the bracket to the corrugated structure.

Figure 13:
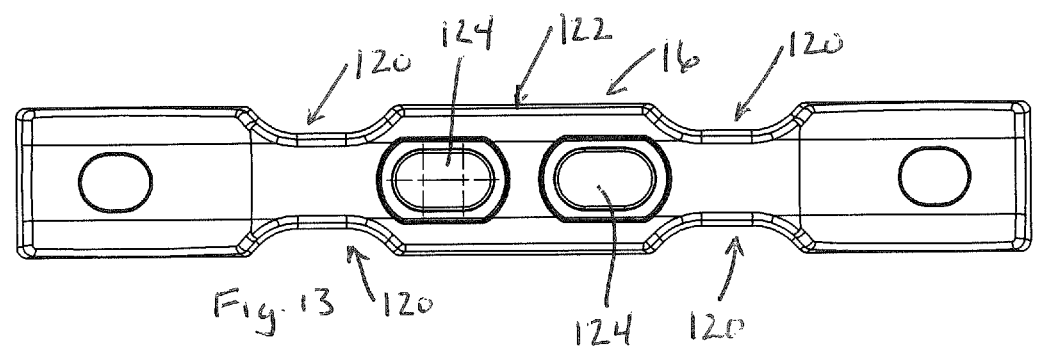
Figure 14:
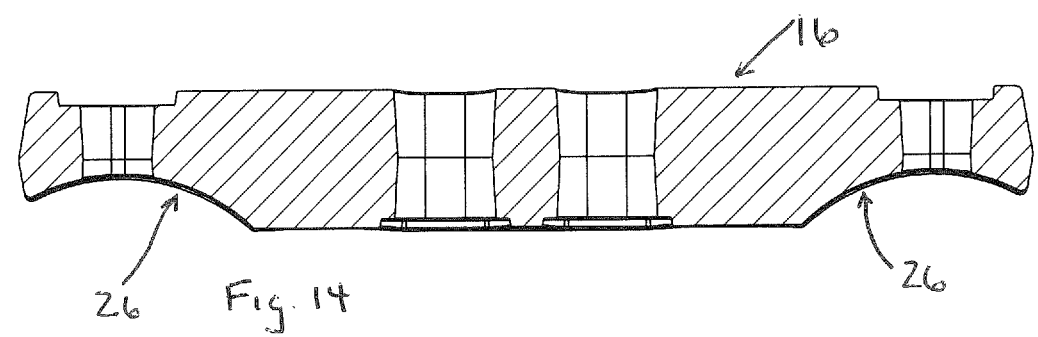
Figure 15A:
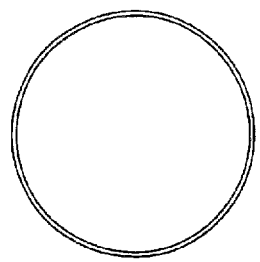
FIGS. 15A-15J depict alternative shapes of corrugated structures.
Figure 15B:
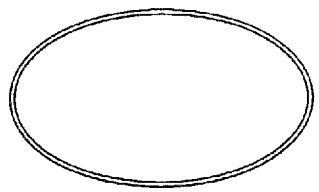
Figure 15C:
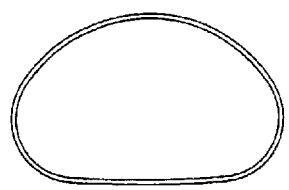
Figure 15D:
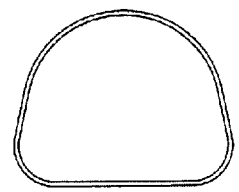
Figure 15E:
Figure 15F:
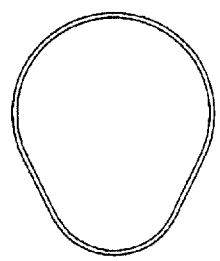
Figure 15G:
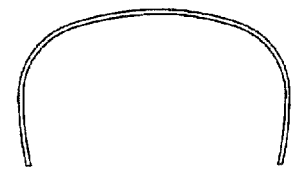
Figure 15H:
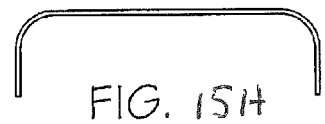
Figure 15I:
Figure 15J:
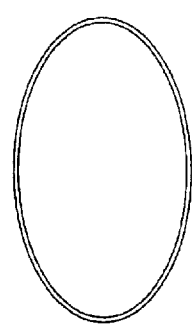

FIGS. 8-14 show a bracket configuration according to the embodiment of FIGS. 6 and 7. As seen in FIGS. 7 and 14, the underside of each end portion of each bracket 16 may be curved in the cross-corrugation direction in regions 26 to closely or substantially match the curvature of the crests of the corrugated metal plate, so as to mate with such crests and provide good stability. Moreover, as seen in FIG. 10 the underside of each bracket (or at least the end portions or each bracket) may be curved in a direction substantially parallel to the corrugation direction to ensure two lines of contact 30 with the corrugation crest 18 even where the curvature of the bracket underside does not match the curvature of the corrugation crest 18. Likewise, the upper surface of the bracket 16 may be curved as shown in a direction substantially parallel to the corrugation direction to reduce the likelihood that the underside of the reinforcing beam mounted thereto will make line point contact with the bracket at an edge such as edge 32 or edge 34.

It is contemplated that the brackets 16 can be formed of metal (e.g., ductile iron casting or other suitable metal), but other variations of materials or composites are possible. As seen in FIGS. 11 and 13 the brackets may include side recesses 120 on either side of a central reinforcement mounting section 122 that includes slotted openings 124 through which the bolt assemblies 22 or 22' (not shown in FIGS. 11 and 13) extend for mounting of the reinforcing member to the brackets 16.

Notably, the brackets and reinforcement can be selected as desired for a given installation of a metal plate structure 10, taking into account required loading etc. This enables the spacing and location of both the reinforcing beams 14 and the brackets 16 to be designed for each specific installation. For example, critical loading areas of a given structure 10 can be identified in advance and then the brackets 16 and reinforcing beams 14 located and installed only as needed to accommodate the critical loading areas. The critical loading areas may be at specific locations along the length or depth L of the structure 10 and/or along the span S of the structure 10. The sizing of the reinforcing beams could vary based upon the specific requirements for each critical loading area.

Embodiments in which reinforcing members are only placed along the top wall (per FIGS. 1-3) are contemplated, but others are possible. For example, each reinforcing member 14 could also traverse the corners where the top wall joins the side walls, or separate corner reinforcements could be used.

In some implementations the brackets 16 may be mounted to the plate structure such that all brackets required for a given reinforcing member are installed first, and then the given reinforcing member can be lifted and placed atop the bracket structures to complete the install. In other implementations, the brackets 16 may be mounted to the reinforcing member first 14 and then the collective bracket and reinforcement assembly lifted and placed atop the corrugated structure to complete the install.

It is to be clearly understood that the above description is intended by way of illustration and example only, is not intended to be taken by way of limitation, and that other changes and modifications are possible.

What is claimed is:

1. A corrugated metal plate structure, comprising:
a plurality of corrugated metal plates connected together to form a corrugated structure having a corrugation direction, a cross-corrugation direction and a curvature running in the corrugation direction;
a reinforcement system including a plurality of brackets mounted on the corrugated structure and spaced apart in the corrugation direction, and an elongated reinforcing member mounted atop the plurality of brackets,
wherein each bracket extends substantially parallel to the cross-corrugation direction and the elongated reinforcement member extends substantially parallel to the corrugation direction,
wherein the reinforcing member is curved in the corrugation direction so as to follow the curvature of the corrugated structure,
wherein a full span of the reinforcement system in the corrugation direction is less than a full span of the corrugated structure in the corrugation direction, and the corrugated structure supports the reinforcement system.

2. The structure of claim 1 wherein each bracket spans a pair of adjacent corrugation crests and the reinforcing member is mounted to the brackets between the corrugation crests.

3. The structure of claim 2 wherein an underside of each bracket is spaced above a corrugation valley that joins the adjacent corrugation crests to provide a space below the bracket and within the corrugation valley.

4. The structure of claim 1 wherein:
each bracket is connected to each corrugation crest by at least one bolt assembly that extends through aligned openings of the bracket and the corrugation crest;
the reinforcing beam is connected to each of the brackets using at least one bolt assembly.

5. A corrugated metal plate structure, comprising:
a plurality of corrugated metal plates connected together to form a corrugated structure;
a reinforcement system including a plurality of brackets mounted in a spaced apart manner on the corrugated structure and an elongated reinforcing member mounted atop the plurality of brackets, wherein an underside of each end portion of each bracket is curved to mate with a curvature of the corrugation crest to which the end portion is connected.

6. The structure of claim 5 wherein the underside of each end portion of each bracket is curved in a direction running substantially parallel with a running direction of the corrugation crests to provide two spaced apart lines of contact between the end portion and the corrugation crest to which it is attached.

7. The structure of claim 6 wherein the corrugation structure is curved along the running direction, the reinforcing member is curved along the running direction, and an upper surface of each bracket is curved in a direction running substantially parallel with the running direction.

8. The structure of claim 7 wherein:
the reinforcing member includes a main beam, an upper flange and a lower flange;
the reinforcing member is connected to a first bracket of the plurality of brackets by a bolt assembly that passes through a first opening in the upper flange and a first opening in the lower flange;
the reinforcing member is connected to a second bracket of the plurality of brackets by a bolt assembly that passes through a second opening in the upper flange and a second opening in the lower flange.

9. A corrugated metal plate structure, comprising:
a plurality of corrugated metal plates connected together to form a corrugated structure having a corrugation direction and a cross-corrugation direction;
a reinforcement system including first and second brackets mounted in a spaced apart manner on the corrugated structure and an elongated reinforcing beam mounted to the first and second brackets;
wherein a full span of the reinforcement system in the corrugation direction is less than a full span of the corrugated structure in the corrugation direction, and the corrugated structure supports the reinforcement system.

10. A corrugated metal plate structure, comprising:
a plurality of corrugated metal plates connected together to form a corrugated structure having first and second corrugation crests, the corrugated structure having a corrugation direction and a cross-corrugation direction;
a reinforcement system including first and second brackets mounted in a spaced apart manner on the corrugated structure and an elongated reinforcing beam mounted to the first and second brackets, wherein each of the first and second brackets spans the first and second corrugation crests, and the reinforcing beam is mounted to the first and second brackets and extends substantially parallel to the corrugation direction at a position between the first and second corrugation crests.

11. The structure of claim 10 wherein:
the first bracket is connected to the first corrugation crest by at least one bolt assembly that extends through both a first opening of the first bracket and a first opening of the first corrugation crest, the first bracket is connected to the second corrugation crest by at least one bolt assembly that extends through a second opening of the first bracket and a first opening of the second corrugation crest;
the second bracket is connected to the first corrugation crest by at least one bolt assembly that extends through a first opening of the second bracket and a second opening of the first corrugation crest, the second bracket is connected to the second corrugation crest by at least one bolt assembly that extends through a second opening of the second bracket and a second opening of the second corrugation crest;
the reinforcing beam is connected to each of the first and second brackets using at least one bolt assembly.

12. The structure of claim 10 wherein an underside of each of the first and second brackets is spaced above a corrugation valley that joins the first and second corrugation crests to provide a space below each of the first and second brackets and within the corrugation valley.

13. The structure of claim 10 wherein:
a first underside portion of the first bracket is curved in the cross-corrugation direction to mate with a curvature of the first corrugation crest to which the first underside portion is connected, a second underside portion of the first bracket is curved in the cross-corrugation direction to mate with a curvature of the second corrugation crest to which the second underside portion is connected;
a first underside portion of the second bracket is curved in the cross-corrugation direction to mate with the curvature of the first corrugation crest to which the first underside portion of the second bracket is connected, a second underside portion of the second bracket is curved in the cross-corrugation direction to mate with the curvature of the second corrugation crest to which the second underside portion of the second bracket is connected.

14. The structure of claim 13 wherein:
the first underside portion of the first bracket is also curved in the corrugation direction to provide two spaced apart lines of contact between the first underside portion of the first bracket and the first corrugation crest;
the second underside portion of the first bracket is also curved in the corrugation direction to provide two spaced apart lines of contact between the second underside portion of the first bracket and the second corrugation crest;
the first underside portion of the second bracket is also curved in the corrugation direction to provide two spaced apart lines of contact between the first underside portion of the second bracket and the first corrugation crest;
the second underside portion of the second bracket is also curved in the corrugation direction to provide two spaced apart lines of contact between the second underside portion of the second bracket and the second corrugation crest.

15. The structure of claim 14 wherein the corrugation structure is curved along the corrugation direction, the reinforcing member is curved along the corrugation direction, and an upper surface of each of the first and second brackets is curved in a direction running substantially parallel with the corrugation direction.

16. A corrugated metal plate structure, comprising:
a plurality of corrugated metal plates connected together to form a corrugated structure having a corrugation direction and a cross-corrugation direction;
a reinforcement system including first and second brackets mounted in a spaced apart manner on the corrugated structure and an elongated reinforcing beam mounted to the first and second brackets, wherein:
the reinforcing beam includes a main beam, an upper flange and a lower flange;
the reinforcing beam is connected to the first bracket by a bolt assembly that passes through both a first opening in the upper flange and a first opening in the lower flange;
the reinforcing beam is connected to the second bracket by a bolt assembly that passes through both a second opening in the upper flange and a second opening in the lower flange.

17. A corrugated metal plate structure, comprising:
a plurality of corrugated metal plates connected together to form a corrugated structure having a corrugation direction and a cross-corrugation direction;
a reinforcement system including:
a first bracket and a second bracket,
the first bracket extending substantially parallel to the cross-corrugation direction and mounted to side-by-side first and second corrugation crests so as to pass over a corrugation valley that joins the first and second corrugation crests,
the second bracket spaced in the corrugation direction from the first bracket, the second bracket extending substantially parallel to the cross-corrugation direction and mounted to the first and second corrugation crests so as to pass over the corrugation valley, and
an elongated reinforcing member extending substantially parallel to the corrugation direction and mounted to both the first bracket and the second bracket.

18. The structure of claim 17 wherein:
the reinforcing member includes a main beam, an upper flange and a lower flange;
the reinforcing member is connected to the first bracket by a bolt assembly that passes through a first opening in the upper flange and a first opening in the lower flange;
the reinforcing member is connected to the second bracket by a bolt assembly that passes through a second opening in the upper flange and a second opening in the lower flange.

19. The structure of claim 17 wherein the reinforcing member is mounted to the first and second brackets and extends substantially parallel to the corrugation direction at a location between the first and second corrugation crests.

* * * * *